United States Patent
Iimori et al.

(10) Patent No.: US 9,103,963 B2
(45) Date of Patent: Aug. 11, 2015

(54) ROD LENS ARRAY AND EQUAL-MAGNIFICATION IMAGING OPTICAL APPARATUS USING ROD LENS ARRAY

(71) Applicant: Mitsubishi Rayon Co., Ltd., Tokyo (JP)

(72) Inventors: Masashi Iimori, Otake (JP); Shingo Inuzuka, Tokyo (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 21 days.

(21) Appl. No.: 14/133,298

(22) Filed: Dec. 18, 2013

(65) Prior Publication Data
US 2014/0177061 A1 Jun. 26, 2014

(30) Foreign Application Priority Data
Dec. 20, 2012 (JP) .................................. 2012-278211

(51) Int. Cl.
G02B 27/10 (2006.01)
G02B 1/04 (2006.01)
G02B 3/00 (2006.01)
H04N 1/031 (2006.01)

(52) U.S. Cl.
CPC .............. *G02B 1/041* (2013.01); *G02B 3/0006* (2013.01); *G02B 3/0087* (2013.01); *H04N 1/0312* (2013.01)

(58) Field of Classification Search
USPC .................................................. 359/619–627
See application file for complete search history.

(56) References Cited

U.S. PATENT DOCUMENTS

| 5,978,146 A | 11/1999 | Kittaka et al. |
| 7,777,964 B2 | 8/2010 | Abe et al. |
| 2002/0063964 A1* | 5/2002 | Toyama ........................ 359/619 |
| 2009/0067055 A1* | 3/2009 | Yamamura .................... 359/622 |
| 2009/0257128 A1 | 10/2009 | Abe et al. |

FOREIGN PATENT DOCUMENTS

| JP | H11-64605 A | 3/1999 |
| JP | 4087503 B2 | 5/2008 |
| WO | 2007/011013 A1 | 1/2007 |

\* cited by examiner

*Primary Examiner* — Mohammed Hasan
(74) *Attorney, Agent, or Firm* — Fitch, Even, Tabin & Flannery LLP

(57) ABSTRACT

A rod lens array is configured so that when a relation between R and $r_0$ is set to be $R \geq r_0 \geq 0.8R$, and the gradient index of the rod lens is approximate to $n(r)^2 = n_0^2\{1-(g \cdot r)^2\}$, an overlap degree m, defined by $m = X_0/2R$, is 2.55 or more and 4 or less and an aperture angle of the rod lens, represented by $n_0 \cdot g \cdot r_0$, is 0.1 or more and less than 0.22. The array is capable of minimizing light quantity unevenness even where there may be assembly error or aged deterioration occurs. An equal-magnification imaging optical apparatus usefully includes a rod lens array.

6 Claims, 1 Drawing Sheet

ROD LENS ARRAY AND EQUAL-MAGNIFICATION IMAGING OPTICAL APPARATUS USING ROD LENS ARRAY

CROSS-REFERENCE TO RELATED APPLICATIONS

This U.S. application claims priority from Japanese Patent Application 2012-278211, filed Dec. 20, 2012, the complete disclosure of which is hereby incorporated herein by reference in their entirety for all purposes.

BACKGROUND OF THE INVENTION

1. Field of the Invention

The present invention relates to a rod lens array and an equal-magnification imaging optical apparatus using a rod lens array, and more particularly, to a rod lens array used for reading an image in an image reading apparatus and an equal-magnification imaging optical apparatus using a rod lens array.

2. Description of the Related Art

In the related art, in an image reading apparatus such as a scanner or a facsimile, a technique of allowing light emitted from a light source to irradiate a document and allowing a CCD sensor to receive the reflected light through a rod lens array is widely used.

In recent years, it is desired to improve a document reading accuracy of the image reading apparatus, and as one of means for achieving the improvement, improving of resolution (MTF: Modulation Transfer Function) of the rod lens array is performed. In addition, since the reading accuracy of the rod lens array depends on an overlap degree (m value) and unevenness in the quantity of light of an image transmitted by a number of rod lenses arranged, a technique of improving the reading accuracy of the rod lens array by setting these values to appropriate values is known (for example, Japanese Patent Laid-Open No. 11-64605).

If the overlap degree m exceeds 2.5, brightness of the image is decreased. Therefore, Japanese Patent Laid-Open No. 11-64605 discloses a technique of suppressing the light quantity unevenness by setting the overlap degree of rod lens to be in a range of 1.61 to 1.80 or a range of 2.06 to 2.50.

However, although the overlap degree is set in the range disclosed in Japanese Patent Laid-Open No. 11-64605, the light quantity unevenness may not be sufficiently suppressed. Practically, in order to prevent deterioration in image caused by the light quantity unevenness, it is necessary to perform correction using electric light quantity for allowing the entire image to have uniform brightness or to perform shading correction for correcting sensitivity of a sensor. Particularly, when an optical apparatus such as a facsimile, a copier, a printer, and a scanner is to be assembled, assembly error occurs between a surface of a document and an end surface of a rod lens array or between a surface of a sensor and the end surface of the rod lens array. In addition, the performance of a rod lens is easily influenced by aged deterioration or use environment. Furthermore, even in the case where a housing is slightly deformed due to vibration during the transportation of a highly-accurate optical member using the rod lens array, the performance of the rod lens is changed.

Therefore, although the light quantity unevenness is corrected before manufacturing the rod lens array, the correction needs to be performed again at the site of the assembly of an actual optical apparatus such as a facsimile, a copier, a printer, and a scanner.

SUMMARY OF THE INVENTION

The present invention is to provide a rod lens array capable of minimizing light quantity unevenness even in the case where assembly error or aged deterioration occurs and an equal-magnification imaging optical apparatus using such a rod lens array.

According to experiments executed by the inventors of the present invention, it has been found that, by setting the overlap degree m of the rod lens to be 2.55 or more and 4 or less and setting the aperture angle of the rod lens represented by $n_0 \cdot g \cdot r_0$ to be 0.1 or more and less than 0.22, it is possible to suppress the light quantity unevenness and to increase the resolution by increasing the overlap degree.

Therefore, in order to solve the above-described problems, according to an aspect of the present invention, there is provided a rod lens array configured by arranging a plurality of rod lenses each having a gradient index in a radial direction in one row with a predetermined arrangement pitch so that optical axes of the rod lenses are parallel to each other, wherein light quantity unevenness ΔE is 10% or less, and resolution MTF measured by using a lattice pattern with a spatial frequency of 6 line pairs/mm is 85% or more.

In addition, according to another aspect of the present invention, there is provided a rod lens array configured by arranging a plurality of rod lenses each having a gradient index in a radial direction in one row with an interval of arrangement pitch 2R so that optical axes of the rod lenses are parallel to each other, wherein, when a relation between R and $r_0$ is set to be $R \geq r_0 \geq 0.8R$ and the gradient index of the rod lens is approximate to $n(r)^2 = n_0^2 \{1-(g \cdot r)^2\}$, an overlap degree m defined by $m = X_0/2R$ is 2.55 or more and 4 or less and an aperture angle of the rod lens represented by $n_0 \cdot g \cdot r_0$ is 0.1 or more and less than 0.22. Herein, r represents a distance from an optical axis, n(r) represents a refractive index at a position of the distance r from the optical axis, $n_0$ represents a refractive index at the center of the rod lens, g represents a gradient index constant, $X_0$ represents a radius of field of view ($X_0 = -r_0 \cos(Z_0 \pi/P)$), $r_0$ represents an effective radius of the rod lens, $Z_0$ represents a length of the rod lens, and P represents a period length ($P = 2\pi/g$) of the rod lens.

In the related art, there is a problem in that, if the overlap degree m exceeds 2.5, the brightness of image is decreased, and thus, the resolution is decreased. However, in the rod lens array according to the present invention, by designing the aperture angle relatively as small as 0.1 or more and less than 0.22, light is condensed so that it is possible to suppress darkening of an image. Furthermore, it can be understood that the overlap degree is set to be 2.55 or more and 4 or less by using the rod lens having the above-described aperture angle, so that it is possible to provide a rod lens array having very small light quantity unevenness and high resolution.

In the above aspect of the present invention, when $L_0$ represents an operation distance of the rod lens and $Z_0$ represents a length of the rod lens, the lens length $Z_0$ is 4 mm or longer, and the operation distance $L_0$ is 1.1 or more times the lens length $Z_0$ and two or less times the lens length $Z_0$.

In the above aspect of the present invention, a relation between a radius of field of view $X_0$ of the rod lens represented by $X_0 = -r_0 \cos(Z_0 \pi/P)$ and the operation distance $L_0$ satisfies $4.5 \leq L_0/X_0 \leq 5.1$. Herein, g represents a gradient index constant, $r_0$ represents an effective radius of the rod lens, and P represents a period length ($P = 2\pi/g$) of the rod lens.

In the rod lens array according to the present invention, since the aperture angle is relatively small and the radius of field of view is small, it is preferable that the lens length $Z_0$ and the operation distance $L_0$ be set to be long in order to increase the overlap degree m. By setting the values to be in the above-described range, it is possible to easily perform optical design of a rod lens having small light quantity unevenness and high resolution.

In the above aspect of the present invention, two or more rows of the rod lenses are arranged to overlap each other.

According to another aspect of the present invention, there is provided an equal-magnification imaging optical apparatus including: the above-described rod lens array; and a sensor which is disposed to face one end surface of the rod lens array.

According to still another aspect of the present invention, there is provided a method of manufacturing the above-described rod lens array, the method including: preparing a lens array precursor formed by arranging the rod lenses between two substrates; and machining the rod lens array so that an axial length of the rod lens is shortened, wherein an overlap degree m of the lens array precursor is smaller than that of the rod lens array.

In the above aspect of the present invention, the overlap degree m of the lens array precursor is 2.55 or less.

According to the present invention having the above-described configuration, even in the case where assembly error or aged deterioration occurs, it is possible to minimize the light quantity unevenness.

DETAILED DESCRIPTION OF THE PREFERRED EMBODIMENTS

Hereinafter, a rod lens array and an equal-magnification imaging optical apparatus according to an embodiment of the present invention will be described with reference to the drawings.

Figure 1:
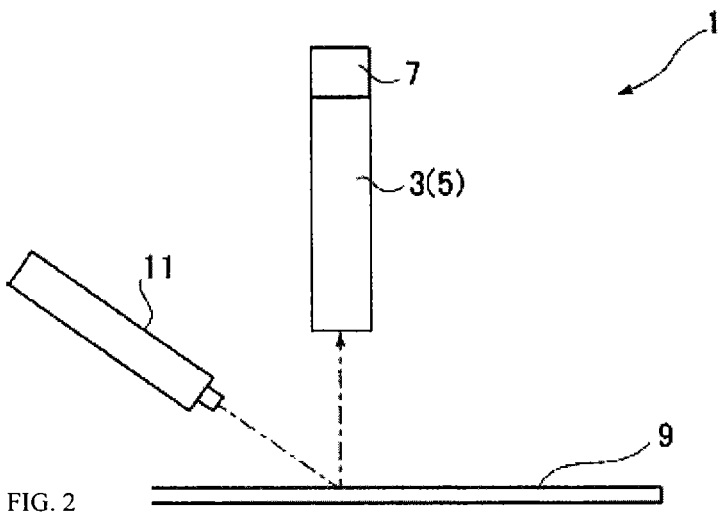
FIG. 1 is a schematic diagram illustrating an equal-magnification imaging optical apparatus according to an embodiment of the present invention.

First, as illustrated in FIG. 1, an equal-magnification imaging optical apparatus 1 is configured to include a rod lens array 5 formed by arranging a plurality of cylindrical rod lenses 3 in parallel, a CCD sensor 7 which is disposed to face one end surface of the rod lens array 5, and a light source 11 which emits light toward a read surface 9 of a document as a read object. The read surface 9 is irradiated with light from the light source 11, and the rod lens array 5 receives light reflected from the read surface 9 and transmits the reflected light to the CCD sensor 7.

The rod lens array 5 is formed by arranging the plurality of rod lenses 3 in parallel in one row or plural rows. The rod lens 3 receives the reflected light from the read surface 9 through one end surface of the rod lens array and thus, an image is formed on the CCD sensor 7 disposed to face the other end surface. The CCD sensor 7 receives the reflected light and converts the light signal into a digital signal to supply the digital signal to information processing unit such as a CPU.

The type of the rod lens used in the present invention is not limited. A plastic rod lens may be used, and a glass rod lens may be used. It is preferable that a gradient index (GI) type rod lens of which the refractive index is continuously decreased in the direction from the center of the circular cross section to the outer circumferential portion be used as the rod lens 3.

It is preferable that a glass transition temperature Tg of a plastic material for the rod lens 3 be 60° C. or higher. If the glass transition temperature is too low, heat resistance of the rod lens array may be insufficient, and it may be difficult to select an adhesive filling the inner portion.

More specifically, as the plastic material for the rod lens 3, polymethyl methacrylate, a copolymer of methyl methacrylate and other monomers, or the like is used. Examples of the other monomers include a fluorinated alkyl (meth)acrylates (refractive index n=1.37 to 1.44) such as 2,2,3,3-tetrafluoropropyl (meth)acrylate, 2,2,3,3,4,4,5,5-octafluoropentyl (meth)acrylate, 2,2,3,4,4,4-hexafluorobutyl (meth)acrylate, 2,2,2-trifluoroethyl (meth)acrylate; (meth)acrylates having a refractive index of 1.43 to 1.62 such as ethyl (meth)acrylate, phenyl (meth)acrylate, benzyl (meth)acrylate, hydroxyalkyl (meth)acrylate, alkylene glycol (meth)acrylate, trimethylolpropane di- or tri-(meth)acrylate, pentaerythritol di-, tri-, or tetra(meth)acrylate, diglycerin tetra(meth)acrylate, and dipentaerythritol hexa(meth)acrylate; diethylene glycol-bis-allyl carbonate; a fluorinated alkylene glycol poly(meth)acrylate; and the like.

A plastic rod lens used in the present invention can be manufactured according to well-known methods disclosed in Japanese Patent No. 4087503, International Patent Application Publication No. 2007/011013, and the like. In addition, the size of the rod lens 3 used in the present invention is not limited. The size of the rod lens 3 may be appropriately selected according to the use purpose. For example, a diameter of the rod lens 3 is preferably in a range of 0.01 mm to 2 mm, more preferably, in a range of 0.05 mm to 1.5 mm, furthermore preferably in a range of 0.1 mm to 1 mm.

Figure 2:
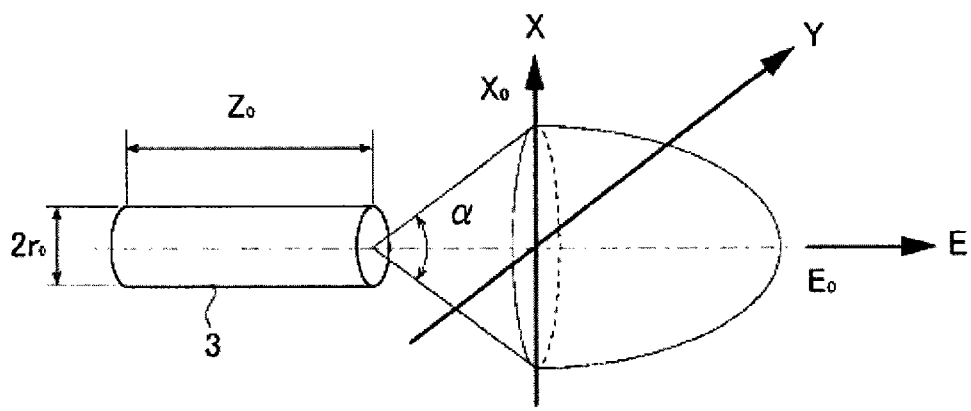
FIG. 2 is a schematic diagram illustrating a rod lens array of the equal-magnification imaging optical apparatus according to the embodiment of the present invention.
Figure 3:
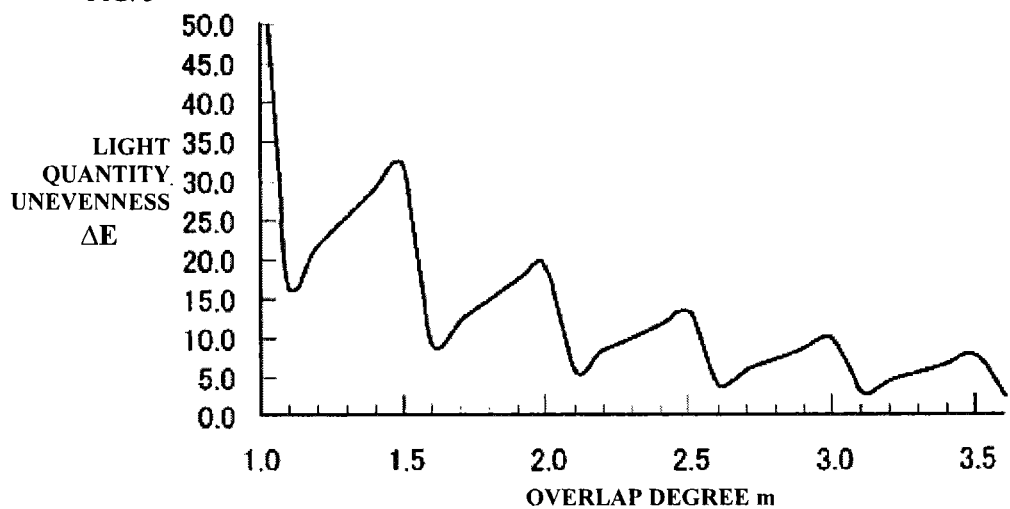
FIG. 3 is a graph illustrating a relation between an overlap degree m and light quantity unevenness $\Delta E$.

FIG. 2 is a diagram illustrating an optical characteristic of a rod lens, and FIG. 3 is a graph illustrating a relation between an overlap degree m and light quantity unevenness $\Delta E$.

As illustrated in FIG. 2, the rod lenses 3 constituting the rod lens array 5 are arranged so that central axes corresponding to optical axes are parallel to each other. The refractive index at the center of each rod lens 3 is represented by $n_0$. The rod lens is set to have gradient index at the center in the radial direction, and a gradient index constant indicating the gradient index of the rod lens is represented by g. In this case, the aperture angle $\alpha$ of the rod lens is represented by the following Mathematical Formula 1.

$$\alpha = n_0 \cdot g \cdot r_0 [\text{rad}] \quad \text{(Mathematical Formula 1)}$$

In addition, in the case where the pitch of the rod lenses 3 between optical axes is represented by 2R, a relation between the pitch of the rod lens 3 and an effective radius $r_0$ of the rod lens 3 is set by the following Mathematical Formula 2.

$$R \geq r_0 \geq 0.8R \quad \text{(Mathematical Formula 2)}$$

The overlap degree m of the rod lens is represented by the following Mathematical Formula 4 when the gradient index of the rod lens is approximate to the Mathematical Formula 3.

$$n(r)^2 = n_0^2 \{1 - (g \cdot r)^2\} \quad \text{(Mathematical Formula 3)}$$

$$m = X_0 / 2R \quad \text{(Mathematical Formula 4)}$$

In Mathematical Formula 4, $X_0$ represents a radius of field of view of the rod lens 3 which is defined by the following Mathematical Formula 5.

$$X_0 = -r_0 \cos(Z_0 \pi / P) \quad \text{(Mathematical Formula 5)}$$

In Mathematical Formula 5, the value $Z_0$ represents a length of a gradient index type lens; and the value P represents a period length of the rod lens 3 which is defined by the following Mathematical Formula 6.

$$P=2\pi/g \qquad \text{(Mathematical Formula 6)}$$

With respect to the radius of field of view $X_0$ of the rod lens 3 represented by Mathematical Formula 5, by drawing a shape of a convex lens illustrated in FIG. 2 and arranging the rod lenses 3 in parallel, the radii of field of view $X_0$ of the adjacent rod lenses 3 overlap each other. Therefore, by widening the radius of field of view $X_0$, the front end portion of the area drawn by the radius of field of view $X_0$ is approximate to a straight line, so that the amplitude of the light quantity unevenness ΔE represented by the following Mathematical Formula 7 is decreased (refer to FIG. 3).

$$\Delta E(i_{max} - i_{min})/i_{min} \times 100 \qquad \text{(Mathematical Formula 7)}$$

Herein, the value $i_{max}$ represents a maximum value of the light quantity, and the value $i_{min}$ represents a minimum value of the light quantity.

The method of measuring the light quantity is not particularly limited, but the light quantity may be measured, for example, by a method in which light (wavelength of 525 nm) from a light source is allowed to be incident on a rod lens array, of which two end surfaces perpendicular to an optical axis are polished, based on a chart having a spatial frequency of 6 line pairs/mm (Lp/mm); and an image is read by a CCD line sensor installed on an imaging surface to measure a maximum value ($i_{max}$) and minimum value ($i_{min}$) of the light quantity.

Herein, as one of the methods of adjusting the overlap degree of the rod lens array, there is a method of increasing the overlap degree m by setting the aperture angle α of the rod lens to be large. However, if the overlap degree m is increased by such a method, the light quantity unevenness ΔE can be decreased, but there is a problem in that the MTF is greatly decreased. Therefore, it is generally considered that if the overlap degree m is increased, the light quantity unevenness ΔE of the rod lens array approaches a minimum value, but the resolution MTF is decreased.

However, the inventors of the present invention found first that, even in the case where the overlap degree m of the rod lens 3 is set to be more than 2.5 that is considered to be the limit in the related art, it is possible to suppress a decrease in resolution MTF by setting the aperture angle of the rod lens 3 to be in a specific range. More specifically, it was found that the overlap degree of the rod lens array is set to be 2.55 or more and 4 or less by setting the aperture angle of the rod lens 3 to be 0.1 or more and less than 0.22, so that it is possible to maintain the light quantity unevenness ΔE to be 10% or less and to maintain the value of MTF measured by using a lattice pattern having a spatial frequency of 6 line pairs/mm to be 85% or more, and thus, the present invention is contrived.

As a method of increasing the overlap degree m, in the related, increasing the aperture angle of the rod lens is generally performed. This is because the imaging distance (operation distance $L_0$) of the rod lens can be decreased by increasing the aperture angle of the rod lens, and rod lens arrays having various overlap degrees m can be manufactured without a change in imaging distance to other rod lens arrays. However, in the method, the resolution is greatly decreased in the range where the overlap degree m is more than 2.5, and in the rod lens array capable of obtaining practical resolution, the upper limit of the overlap degree m is considered to be about 2.5.

On the other hand, the inventors of the present invention found that the overlap degree m is set to be more than 2.55 that is considered to be the limit in the related art by setting the aperture angle to be 0.1 or more and less than 0.22 and setting the lens length $Z_0$ and the operation distance $L_0$ to be long, and thus it is possible to manufacture a rod lens having small light quantity unevenness and high resolution by setting. In addition, the inventors of the present invention found that, even in the case where the overlap degree m is 4 or more, the light quantity unevenness may not almost be decreased, but the resolution is greatly decreased. Therefore, in the present invention, it is preferable that the overlap degree m of the rod lens array be 4 or more. In the present invention, it preferable that the lens length $Z_0$ be 4 mm or longer, and it is preferable that the imaging distance (operation distance) $L_0$ be 1.1 or more times the lens length $Z_0$. If the lens length $Z_0$ is set to be 4 mm or longer and the operation distance $L_0$ is set to be 1.1 or more times the lens length $Z_0$, even in the case of the lens in a range of a relatively small aperture angle, the radius of field of view can be set to be relatively large, so that the overlap degree m can be set to be large. Therefore, it is possible to provide a rod lens array having small light quantity unevenness and high resolution.

In addition, if the radius of field of view $X_0$ is set to be larger than the operation distance $L_0$, the light quantity unevenness is decreased to some extent; but if the radius of field of view $X_0$ exceeds a certain value, the light quantity unevenness is not greatly decreased. Furthermore, if the radius of field of view $X_0$ exceeds a certain value, the resolution is also greatly decreased. Therefore, it is preferable that the radius of field of view $X_0$ and the operation distance $L_0$ satisfy the following Mathematical Formula 7.

$$4.5 \leq L_0/X_0 \leq 5.1 \qquad \text{(Mathematical Formula 7)}$$

If the value of $L_0/X_0$ is less than 4.5, the light quantity unevenness tends to be increased; and if the value is more than 5.1, the resolution tends to be decreased.

In the present invention, the method of setting the aperture angle to the above-described range is not particularly limited, but the ordinarily skilled in the art may appropriately select the method. For example, the aperture angle may be freely set by changing (adjusting) parameters of a main material of lens including a refractive index $n_0$, a gradient of refractive index with respect to the radius r (gradient index g), and an effective radius $r_0$ of rod lens. In addition, the aperture angle may be freely set by adjusting a length $Z_0$ of a gradient index type lens. In addition, the overlap degree may also be set by adjusting the lens length $Z_0$. Since the method of adjusting the lens length $Z_0$ is simple, the method is more preferable.

As a method of manufacturing a rod lens array where the rod lenses 3 according to the present invention are arranged by adjusting the lens length $Z_0$, it is preferable that, after the rod lens array is manufactured, the lens length $Z_0$ be adjusted by cutting and polishing a cross section thereof so that the overlap degree m is set to be more than 2.55. As represented by Mathematical Formula 5, if the lens length $Z_0$ is shortened, the radius of field of view $X_0$ is increased. If the radius of field of view $X_0$ is increased, the overlap degree m can be more easily increased.

In the case of manufacturing the rod lens array of which the overlap degree m is more than 2.55, it is necessary to more strictly control the lens length $Z_{00}$ in comparison to the rod lens array of which the overlap degree m is 2.55 or less. In the above-described method, for example, since after a rod lens array of which the overlap degree m is 2.55 or less is manufactured, the overlap degree m can be adjusted to be more than 2.55 by adjusting the lens length $Z_0$ to be small, it is possible to more easily manufacture a rod lens array having desired values in various optical designs.

As described above, in the rod lens 3 according to the present invention, the overlap degree m is set to be more than 2.5, and the aperture angle is set to be in a range of 0.1 or more and less than 0.22. Therefore, the overlap degree m of the rod lens 3 is increased, so that the light quantity unevenness ΔE can be suppressed. As a result, it is possible to increase the resolution MTF while suppressing the light quantity unevenness of the rod lens 3.

Examples

Hereinafter, Examples and Comparative Examples of the present invention will be described in detail. In the specification, in Examples and Comparative Examples, rod lenses listed in Table 1 were used, and the value of overlap degree m was allowed to be changed.

In Examples and Comparative Examples, values of the refractive index $n_0$ on the optical axis (at the center of the rod lens), the effective radius $r_0$, the gradient index constant g, the aperture angle $n_0 \cdot g \cdot r_0$, the lens length $Z_0$, the lens pitch 2R, the operation distance $L_0$, and the radius of field of view $X_0$ are listed in Table 1. In addition, in Examples 1 to 3, by cutting a rod lens array RA84T-P11 ($Z_0$=4.4 mm) in a longitudinal direction of the lenses manufactured by Mitsubishi Rayon Co., Ltd., $Z_0$=4.13 (Example 1), $Z_0$=4.07 (Example 2), and $Z_0$=4.03 (Example 3) were obtained. In addition, the overlap degree was obtained by the above-described Mathematical Formula 5. In addition, after disposing a diffusion plate on one end surface of the rod lens array and disposing a CCD line sensor on the other end surface to measure data of output intensity of the light quantity, the light quantity unevenness was calculated from a result of the measurement.

A lattice pattern with a spatial frequency of 6 line pairs/mm (300 dpi) was used as a read object, and the lattice pattern was irradiated with light having a wavelength of 525 nm. Next, light reflected from the lattice pattern was allowed to be incident on the rod lens array, and an image was formed on the CCD line sensor. Next, at this time, the maximum value ($i_{max}$) and minimum value ($i_{max}$) of the light quantity of the focused image of the lattice image were measured, and the resolution MTF was calculated by Mathematical Formula 8.

$$\text{MTF (\%)} = \{(i_{max} - i_{min})/(i_{max} + i_{min})\} \times 100 \quad \text{(Mathematical Formula 8)}$$

Measurement conditions and measurement results of Examples are listed in the following Table 1.

TABLE 1

|  | Example 1 | Example 2 | Example 3 |
|---|---|---|---|
| Refractive Index on Optical Axis $n_0$ | 1.496 | 1.496 | 1.496 |
| Effective Radius $r_0$ [mm] | 0.159 | 0.159 | 0.159 |
| Gradient index Constant g | 0.84 | 0.84 | 0.84 |
| Aperture Angle $n_0 \cdot g \cdot r_0$ [rad] | 0.2 | 0.2 | 0.2 |
| Lens Length $Z_0$ [mm] | 4.13 | 4.07 | 4.03 |
| Lens Pitch 2R [mm] | 0.36 | 0.36 | 0.36 |
| Operation Distance $L_0$ [mm] | 4.8 | 5.7 | 6.5 |
| Radius of Field of View $X_0$ [mm] | 0.97 | 1.14 | 1.3 |
| Overlap Degree m $X_0$/2R | 2.7 | 3.2 | 3.6 |
| Light Quantity Unevenness ΔE (%) | 7 | 6 | 5 |
| Resolution MTF (%) | 94 | 91 | 90 |
| $L_0/X_0$ | 4.948 | 5.000 | 5.000 |
| $L_0/Z_0$ | 1.162 | 1.400 | 1.613 |

As understood from Table 1, in Examples, since the aperture angle of the rod lens is set to be in a range of 0.1 or more and less than 0.22, although the overlap degree m is set to be high, the light quantity unevenness is maintained small, and the resolution MTF is maintained high.

In Comparative Examples 1 to 10, various measurement values were obtained in a similar manner to Example 1, except that the rod lens array listed in Table 2 was used.

Measurement conditions and measurement results of Comparative Examples are listed in the following Table 2.

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| Refractive Index on Optical Axis $n_0$ | 1.513 | 1.513 | 1.513 | 1.59 | 1.59 | 1.59 | 1.59 | 1.59 | 1.59 | 1.59 | 1.59 |
| Effective Radius $r_0$ [mm] | 0.218 | 0.218 | 0.218 | 0.141 | 0.141 | 0.141 | 0.142 | 0.144 | 0.145 | 0.145 | 0.145 |
| Gradient index Constant g | 0.89 | 0.89 | 0.89 | 1.008 | 0.99 | 0.995 | 0.994 | 0.989 | 0.994 | 0.994 | 0.994 |
| Aperture Angle $n_0 \cdot g \cdot r_0$ [rad] | 0.294 | 0.294 | 0.294 | 0.226 | 0.222 | 0.223 | 0.224 | 0.226 | 0.229 | 0.229 | 0.229 |
| Lens Length $Z_0$ [mm] | 3.82 | 3.78 | 3.74 | 3.613 | 3.608 | 3.565 | 3.563 | 3.565 | 3.505 | 3.505 | 3.505 |
| Lens Pitch 2R [mm] | 0.615 | 0.615 | 0.615 | 0.4 | 0.4 | 0.4 | 0.4 | 0.4 | 0.4 | 0.4 | 0.4 |
| Operation Distance $L_0$ [mm] | 5.54 | 6.41 | 7.6 | 2.442 | 2.907 | 3.074 | 3.121 | 3.27 | 3.66 | 3.66 | 3.66 |
| Radius of Field Of View $X_0$ [mm] | 1.64 | 1.89 | 2.24 | 0.57 | 0.66 | 0.7 | 0.715 | 0.754 | 0.851 | 0.988 | 1.035 |
| Overlap Degree m $X_0$/2R | 2.7 | 3.1 | 3.6 | 1.42 | 1.65 | 1.75 | 1.79 | 1.89 | 2.13 | 2.47 | 2.59 |
| Light Quantity Unevenness ΔE (%) | 3 | 2 | 2 | 24 | 13 | 14 | 14.5 | 16 | 7.5 | 12.5 | 7.5 |
| Resolution MTF (%) | 82 | 77 | 70 | 82.13 | 80.76 | 78.74 | 78.58 | 75.33 | 77.13 | 67.39 | 56.24 |

TABLE 2-continued

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| $L_0/X_0$ | 3.378 | 3.392 | 3.393 | 4.284 | 4.405 | 4.391 | 4.365 | 4.337 | 4.301 | 3.704 | 3.536 |
| $L_0/Z_0$ | 1.450 | 1.696 | 2.032 | 0.676 | 0.806 | 0.862 | 0.876 | 0.917 | 1.044 | 1.044 | 1.044 |

On the other hand, it can be understood from Table 2 that, in Comparative Examples 1 to 3, since the aperture angle of the rod lens is set to be 0.22 or more (deviated from the range), the resolution MTF is greatly decreased as the overlap degree m is increased. In addition, it can be understood that, in Comparative Examples 4 to 11, in the range where the overlap degree m is 2.55 or less, the light quantity unevenness is large, and as the overlap degree m is increased, the resolution is decreased.

What is claimed is:

1. A rod lens array configured by arranging a plurality of rod lenses each having a gradient index in a radial direction in one row with an interval of arrangement pitch 2R so that optical axes of the rod lenses are parallel to each other, wherein, when a relation between R and $r_0$ is set to be $R \geq r_0 \geq 0.8R$ and the gradient index of the rod lens is approximate to $n(r)^2 = n_0^2 \{1-(g \cdot r)^2\}$, an overlap degree m defined by $m = X_0/2R$ is more than 2.5 and an aperture angle of the rod lens represented by $n_0 \cdot g \cdot r_0$ is 0.1 or more and less than 0.22, and wherein r represents a distance from an optical axis, n(r) represents a refractive index at a position of the distance r from the optical axis, $n_0$ represents a refractive index at the center of the rod lens, g represents a gradient index constant, $X_0$ represents a radius of field of view ($X_0 = -r_0$ cos ($Z_0 \pi/P$)), $r_0$ represents an effective radius of the rod lens, $Z_0$ represents a length of the rod lens, and P represents a period length ($P = 2\pi/g$) of the rod lens.

2. The rod lens array according to claim 1, wherein a relation between the radius $X_0$ and $L_0$ satisfies $4.5 \leq L_0/X_0 \leq 5.1$.

3. The rod lens array according to claim 1, wherein two or more rows of the rod lenses are arranged to overlap each other.

4. An equal-magnification imaging optical apparatus comprising:
the rod lens array according to claim 1; and
a sensor which is disposed to face one end surface of the rod lens array.

5. A method of manufacturing the rod lens array according to claim 1, the method comprising:
preparing a lens array precursor formed by arranging the rod lenses between two substrates; and
machining the rod lens array so that an axial length of the rod lens is shortened,
wherein an overlap degree m of the lens array precursor is smaller than that of the rod lens array.

6. The method of manufacturing the rod lens array according to claim 5, wherein the overlap degree m of the lens array precursor is 2.55 or less.

* * * * *